Figure 1:
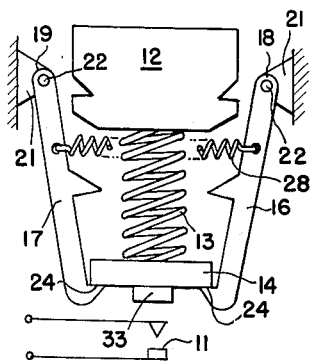

Dec. 28, 1965   A. F. GALLISTEL ETAL   3,226,504
ACCELERATION-SENSITIVE SWITCH
Filed Nov. 9, 1962                     2 Sheets-Sheet 1

*INVENTORS*
ALBERT F. GALLISTEL
SETH B. LINDSEY
BY
*Harold D. Jastram*
ATTORNEY

Dec. 28, 1965  A. F. GALLISTEL ETAL  3,226,504
ACCELERATION-SENSITIVE SWITCH

Filed Nov. 9, 1962  2 Sheets-Sheet 2

*INVENTORS*
ALBERT F. GALLISTEL
SETH B. LINDSEY

BY *Harold D. Jastram*

ATTORNEY

United States Patent Office 3,226,504
Patented Dec. 28, 1965

3,226,504
ACCELERATION-SENSITIVE SWITCH
Albert F. Gallistel, Wayzata, and Seth B. Lindsey, Minneapolis, Minn., assignors to General Mills, Inc., a corporation of Delaware
Filed Nov. 9, 1962, Ser. No. 236,584
15 Claims. (Cl. 200—61.53)

This invention relates to an acceleration responsive device and more particularly to an acceleration responsive device designed to close terminal contacts in response to acceleration forces.

Missiles, projectiles from conventional weapons, and other devices which are subjected to acceleration forces often utilize acceleration responsive devices to actuate electrical circuitry, arm warheads, and perform other functions which are dependent on the acceleration of the missiles or other device during its flight. Normally, the circuitry which is to be actuated by an acceleration device is subjected to a number of conditions which interrupt or interfere with the efficient operation of switches since the missile or other device is normally travelling at very high speeds and is subjected to high acceleration forces. The efficient operation of switches and other mechanisms is interfered with since the missile in flight generates a number of velocity and acceleration force components which tend to affect the moving parts of any mechanism or switch involved. These acceleration forces tend to create stresses and force components on the various parts which often prevents the efficient and positive closing or opening of electrical terminals or the efficient movement of other parts to be actuated by the acceleration responsive device.

Often the same acceleration forces which tend to interrupt the operation of ordinary switches must also be utilized to determine the precise moment at which particular circuitry or mechanisms are to be actuated during the flight of the missile or projectile. Consequently, any acceleration responsive device used in such an environment must be sensitive enough to close a circuit or actuate a device when the generated forces reach a particular magnitude, also, the device must be adequately rugged to positively actuate the contacts or other mechanism involved.

Often an additional requirement for these acceleration responsive devices is that they lock the actuated circuit or mechanism into place so that additional acceleration forces which are generated after the operation of the contacts or mechanism does not affect the contacts in the actuated position. This requirement is particularly important when the circuitry or mechanism which is involved is the type of circuitry which must remain operative for an extended period of time after the actuation of the circuitry or mechanism by the acceleration reponsive device.

It is therefore an object of the present invention to provide a new and improved acceleration responsive device.

It is another object of the present invention to provide a new and improved device for closing terminal contacts to actuate other mechanisms in response to acceleration forces.

It is another object of the present invention to provide a new and improved acceleration responsive device for operating terminal contacts or other mechanisms and for locking the contacts or other mechanism in the operated position.

It is yet a further object of the present invention to provide a new and improved acceleration responsive device for operating contacts or other mechanisms by utilizing all of the energy stored in a spring which is flexed by forces generated by acceleration of the device.

It is another object of the present invention to provide a new and improved resettable acceleration responsive device for operating terminal contacts or other mechanisms by releasing, in a controlled manner, the energy stored in a spring which is compressed by forces generated by acceleration of the device.

With these and other objects in view, the present invention contemplates a device having a mass which is movable in response to acceleration forces generated when a missile or other carrier of the device is accelerated. A contact actuator is held out of engagement by a set of levers, or a single lever until acceleration forces of a predetermined magnitude are operating on the acceleration responsive mass. A spring is placed between the acceleration responsive mass and the contact actuator so that the spring takes up and stores the generated energy. The acceleration responsive mass engages the lever or levers which are holding the contact engaging member to release the contact engaging member. The flexed spring then positively forces the contact engaging member against the terminal contacts or other mechanisms to positively actuate the contacts by utilizing the stored energy in the spring. The acceleration responsive mass is then locked in position by the levers so that the contacts will remain closed until the entire device is reset.

Figure 2:
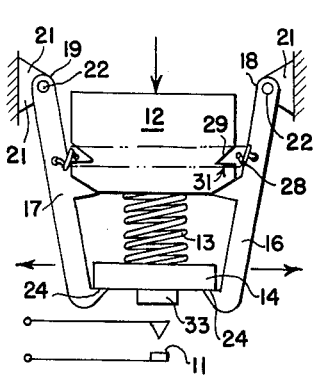
Figure 3:
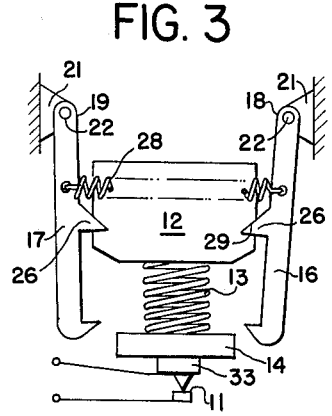
Figure 4:
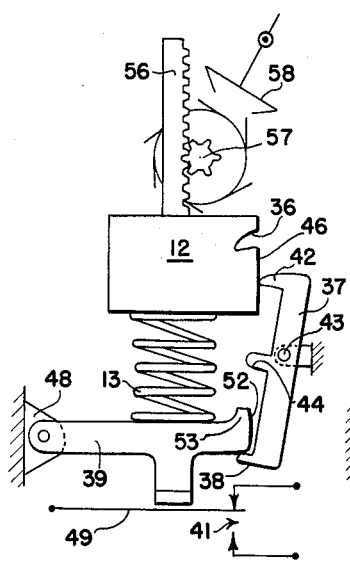
Figure 5:
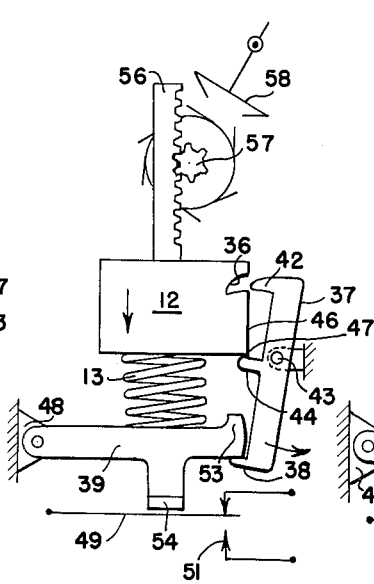
Figure 6:
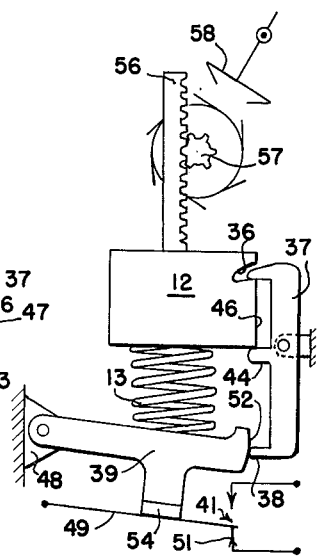
Figure 7:
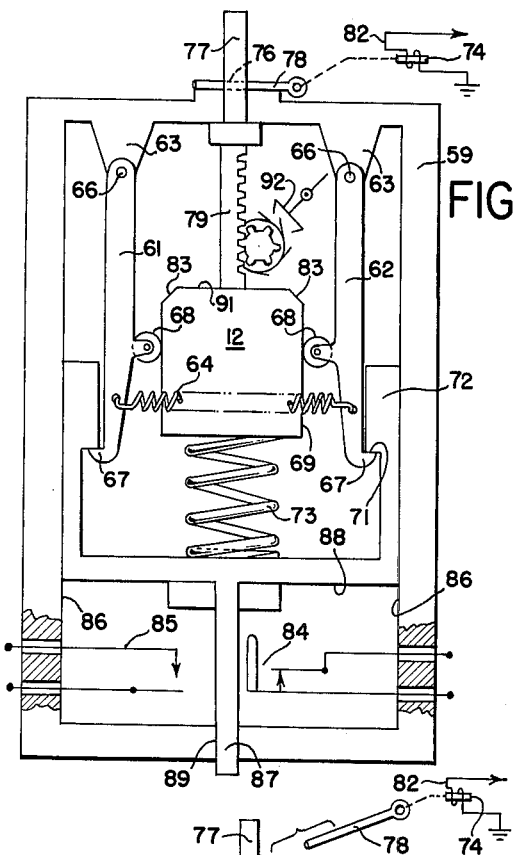
Figure 9:
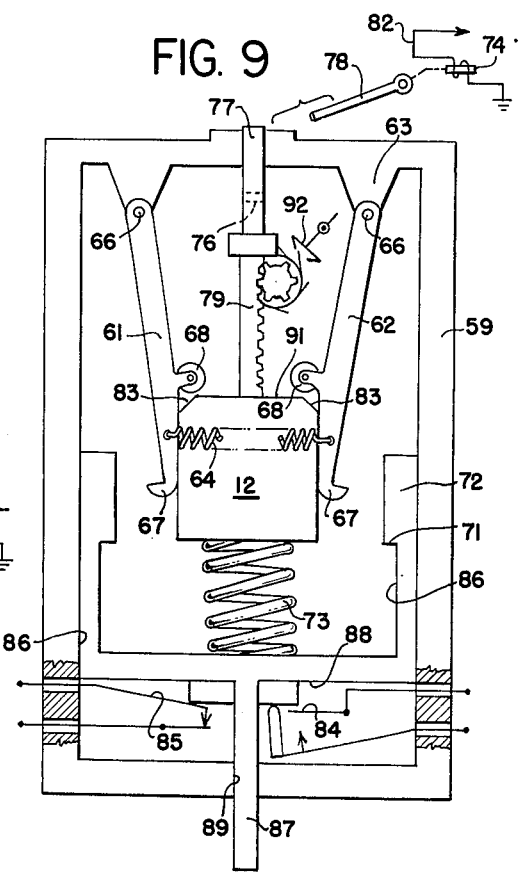
Figure 8:
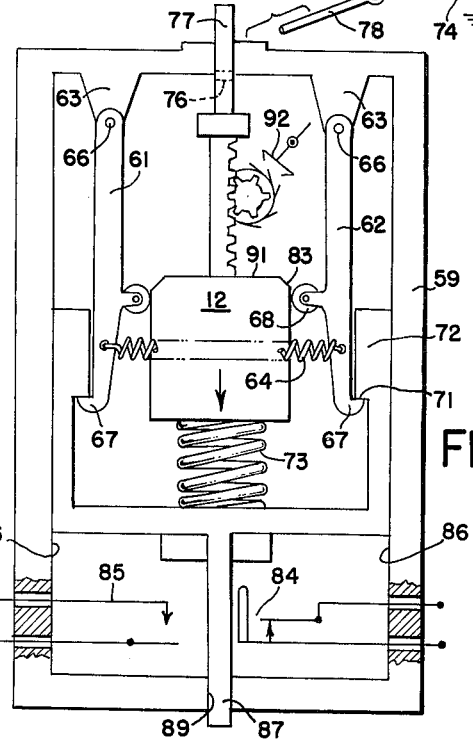

A complete understanding of the invention may be obtained from the following detailed description of an apparatus forming specific embodiments when read in conjunction with the drawings in which:

FIGURES 1, 2, and 3 show an acceleration responsive device in various operating positions;

FIGURES 4, 5, and 6 show an acceleration responsive device which is an alternate embodiment of that disclosed in FIGURES 1, 2, and 3 and which permanently locks a set of contacts in the closed position, and FIGURES 7, 8, and 9 show an acceleration responsive switch in various operating positions and which is resettable in the event the switch is reused.

Refer to FIGURES 1, 2, and 3 of the drawings. These figures illustrate one embodiment of the invention and show some of the linkages involved in constructing an acceleration responsive device for closing a pair of electrical contacts 11. A movable member 12 is situated with respect to the contacts 11 and the remaining elements of the responsive device so that acceleration forces which are exerted on a missile or projectile generate force components in the member 12 which act in the arrow direction as shown in FIGURE 2. Reference is made to acceleration forces throughout this specification, however, negative-acceleration forces are also considered within the meaning of acceleration forces. As the missile or projectile which is carrying the member 12, accelerates, the member 12 moves against the resistance of a spring 13 which may be a coil spring, leaf spring, or other energy storing device. In this particular embodiment, the spring 13 is captured between the member 12 which has a large mass and a contact engaging member or actuator 14.

The contact engaging member or actuator 14 is held in a stationary position by a pair of levers 16 and 17. Levers 16 and 17 are pivotally attached at ends 18 and 19 respectively to the chassis 21 of a switch housing or to the missile itself. The levers 16 and 17 pivot about points 22.

Each of the levers 16 and 17 have a release catch 24 opposite the pivot points 22. These release catches are designed to engage the contact engaging member 14 and hold the member 14 stationary as the acceleration responsive mass 12 is compressing the coil spring 13 in response to acceleration forces which are being generated in the acceleration responsive device 12. Energy is thus taken up and stored by this spring 13.

The spring 13 is compressed by the member 12 as it moves vertically downward as shown in FIGURE 2. When the member 12 has travelled a predetermined distance, it engages cam followers 26 which are situated between the pivot points 22 and the release catches 24 on the levers 16 and 17. The cam surface 27 on the member 12 engage the cam followers 26 and force the levers against the resistance of spring 28 in the outward direction as shown in FIGURE 2. Spring 28 is connected to each of the levers 16 and 17 and is a coil spring which tends to draw the levers 16 and 17 toward each other to insure that the catches 24 positively engage the contact engaging member 14. This spring 28 may be a simple coil spring which is under tension. Due to the tensioning of the spring 28 the levers 16 and 17 are pivoted about point 22 to capture the contact engaging member 14 between the levers 16 and 17.

The acceleration responsive member or mass 12 engages the cam followers 26 and forces the levers 16 and 17 apart to rotate the levers as shown by the arrows projecting outward from these levers. After the levers 16 and 17 are pivoted a predetermined distance, as determined by the physical configuration of the release catches 24, the contact engaging member 14 is released from the catches 24.

Release of the contact engaging member 14 permits the coil spring 13, which is compressed and is storing a considerable amount of energy due to the movement of the member 12, to force the contact engaging member 14 in a vertically downward direction against the contacts 11. From this it can be seen that the energy stored in the coil spring 13 is released to positively force the contact engaging member 14 against the contacts 11.

Refer now to FIGURE 3 of the drawings. The acceleration responsive member or mass 12 continues to travel vertically downward after the contact engaging member closes contacts 11. The member 12 moves vertically downward until the cams 26 engage notches 29 which are positioned in the side of the member 12. The notches 29 are formed so that each notch has a flat surface 31 which engages a flat surface 32 of the cam 26. These flat surfaces resist reverse movement of the member 12. The coil spring 28 which is holding the levers 16 and 17 together forces the cams 26 into the notches 29 and hold the levers 16 and 17 in this position so that the member 12 will not back off the spring 13. Any reduction of the acceleration forces does not result in return of the member 12 to its original position but rather the member 12 is retained in this final position illustrated in FIGURE 3 due to the locked cam 26 and notches 29. Hence the contacts 11 are held in the closed position by the member 14 which is forced against the contact 11 by the compressed spring 13.

The distance between the flat surface 31 of notches 29 and the contacts 11 is a fixed distance such that the spring 13 remains compressed. Depending upon the physical needs of the particular acceleration responsive device, the compression of the spring 13 and tension of spring 28 can be controlled to satisfy the particular stresses and strains which are encountered by the device. The spring 13, which is a calibrated spring, insures that the contact engaging member 14 engages the contacts 11 and keeps them in the closed position even when the device is encountering stresses and strains. The calibrated spring 13 is pre-compressed to a value equal to some multiple of the weight of member 12. All of the energy stored in the spring 13 is used to close the contacts 11.

In the event contacts 11 are electrical contacts and not a simple mechanical mechanism, an insulating member 33 may be placed on the contact engaging member 14 to prevent electrical shorts through the member 14 and through the acceleration device. This insulation 33 may be any suitable insulating material which will satisfy the particular requirements of the circuitry involved. The insulating member 33 may be placed on the contact engaging member 14 in a variety of ways. For instance, the insulating member 33 may be attached to the member 14 by a simple adhesive or if a stronger bond is necessary, set screws and rivets, which are counter sunk into the insulating material 13, may be used.

In the event the device must be reset or the contacts 11 must be reset, the acceleration responsive device may be reset. To reset the device, the levers 16 and 17 are simply moved apart to remove the cams 26 from notches 29. The acceleration responsive member or mass 12 is then simply returned to the starting position illustrated in FIGURE 1, and the levers are released to be drawn together by spring 28. The contact engaging member 14 is returned between the levers 16 and 17 so that member 14 is again engaged by released catches 24. The device is thus reset and ready for a subsequent actuation of contacts 11.

Often a positively operating acceleration responsive switch or device is needed which will close circuit contacts and then lock itself permanently. At switch or device such as this may be needed in such things as missiles. The device is used to arm the missile by locking a circuit closed or by actuating a mechanism which must remain in the closed position until the missile is exploded by a warhead. The prime requisite is that the device must positively actuate the circuit or mechanism which arms the missile and it must lock the mechanism or contacts in the operated position. A device which will satisfy these requirements is shown in FIGURES 4, 5 and 6.

The basic theory of operation which was described in connection with FIGURES 1, 2, and 3 is also utilized in this permanently locking device. The difference between the two devices occurs primarily in the operating linkages which permanently lock the contacts in position. The acceleration responsive member 12 is substantially the same as that shown in FIGURES 1, 2, and 3 except that only a single locking notch 36 is utilized to cooperate with a lever 37 to operate and lock the device. The starting position of this permanently locking device is shown in FIGURE 4 with the lever 37 in the position shown.

The lever 37 has a release catch 38 which is similar to the release catch 24, however the release catch 38 serves a second function in this device. The release catch 38 serves a further function of maintaining the lever 37 in a pivoted position after the arming or switch closing member 39 is forced against the contacts 41. Opposite the release catch 38 is a safety catch 42 which serves a function similar to that served by the cam 26 in the previously described device. The safety catch 42 however does not act as a cam in this device but serves solely as a safety catch to prevent the acceleration responsive member 12 from reversing its direction due to external forces. The lever 37 is pivoted about pivot point 43 and not about one end of the lever as previously noted in connection with the above described device.

Note that the pivot point 43 is intermediate the ends of the lever 37 and is positioned above a cam follower or trigger catch 44. Trigger catch or cam 44 serve substantially the same function as the cam 26 except that it does not engage the member 12 to lock the member as cam 26 did.

Acceleration forces generated by the moving missile or projectile force the member 12 in a downward direction as indicated by the arrows in FIGURE 5. These acceleration forces drive the member 12 toward the contact closing member 39 thus compressing the coil spring 13 which is captured between the member 12 and the contact closing member 39.

As the member 12 is travelling downward, the safety catch 42 rides along surface 46 of the member 12. After member 12 moves down a predetermined distance, the corner or cam surface 47 of the member 12 strikes the cam follower 44. Pivot point 43 of the lever 37 is above the cam follower 44. The lower section of the lever, which contains the release catch 38, pivots in the counterclockwise direction as shown in FIGURE 5. At the moment the cam surface 47 strikes the cam follower 44, the safety catch 42 disengages the surface 46 and engages the notch 36 of the member 12. This permits counterclockwise rotation of the lower portion of the lever 37 and counterclockwise rotation of the safety catch 42 into the notch 36.

While the spring 13 is being compressed by the downwardly moving member 12, the contact engaging member 39 remains stationary since it is held in position by the catch 38 and the rigid but pivotal attachment to the chassis 48 of the missile or device. After lever 37 is pivoted by the downwardly travelling member 12, however, the spring 13 exerts a force against the member 39 due to the energy stored in the spring as a result of compression of the spring between the members 12 and 39. The stored energy in the spring 13 positively forces the member 39 against the contact lever 49 and moves the contact to terminal 51 of the contacts 41. Note again that the energy stored in the spring 13, as a result of the acceleration forces exerted on member 12, is utilized to force the contact engaging member 39 into engagement with the contacts 41 to positively force the various members of the contacts into engagement with each other.

Another function of the release catch 38 is illustrated in FIGURE 6 of the drawings where the device is shown in its permanently locked position. The release catch 38 rides along surfaces 52 of the member 39 and locks the lever 37 so that it cannot rotate in the clockwise direction. After the member 39 is forced downwardly by the spring 13, the finger 53 of the member 39 acts as a locking member against which the release catch 38 comes to rest. The safety catch 42 prevents the member 12 from reversing its direction and releasing the pressure on the compressed spring 13, consequently, the member 39 is held in the downward position as shown in FIGURE 6. With member 39 in this downward position, the lever 36 is prevented from rotating out of its final position by the release catch 38 bearing against surface 52 and by the locking engagement between the notch 36 and the safety catch 42. Consequently, the device remains permanently locked and is not sensitive to forces which tend to unlock similar devices.

Unlike the previously described acceleration responsive device, the lever 37 of this permanently locking variety does not contain any spring biasing means. The lever 37 is simply connected to the chassis 48 of the missile or switch frame and is positively actuated by the moving members 12 and 39.

If the member 39 is to actuate a set of electrical contacts, an insulation member 54 may be placed on the member 39 so that no electrical short will occur between the contacts 41 and the member 39. This insulation member 54 may be, as previously noted, made of any insulation material which satisfactorily serves the purpose of reducing the shorts through the mechanism.

Frequently acceleration switching devices are required to sense acceleration and integrate it as some function of time. A mechanism may be provided to set or control the exact time integration which will occur between the first movement of the member 12 and the final closure of the contacts or actuation of a mechanical device by the member 39. An example of a time delay mechanism which may be used in an acceleration responsive device is shown in FIGURES 4, 5, and 6. A rack 56 is connected to the member 12 and engages a pinion 57. A conventional escapement type mechanism, which is graphically illustrated, is connected to the pinion 57. When the rack and member 12 begin to move downward under the influence of generated acceleration forces, the escapement 58 comes into play to control the movement of the member 12 in the vertically downward direction. This escapement 58 which is connected to the rack and pinion effectively releases the energy developed in the member 12 in a controlled manner. The energy is released so that the member 12 strikes the cam 44 at a predetermined time or at a predetermined acceleration time product after the member 12 begins to move in response to developed acceleration forces. Other types of escapement mechanisms other than that shown in the drawings may be utilized to attain the required integral function for the acceleration responsive device. Such a variation may involve a hydraulic or pneumatic type system designed to release energy developed by the acceleration forces at a predetermined rate.

FIGURES 7, 8, and 9 show a further embodiment of a device incorporating the theories previously described. A chassis 59 is provided for housing the entire assembly and for acting as a guide for the various working parts of the mechanism. Levers 61 and 62 correspond to levers 16 and 17 of the foregoing device. Each lever 61 and 62 is connected to the guide or housing 59 by a projected portion of the housing 63. The levers 61 and 62 are pivotally connected to the housing 59 and are forced together by a spring 64 which is connected to the lower portion of the levers 61 and 62. Opposite the pivot points 66 of the levers 61 and 62 is a release catch 67 which performs the same function as release catch 24. Cam followers 68 which are actually rollers in this case are attached to the levers 61 and 62 intermediate the pivot point 66 and 67 and follow the outer surface 69 of the acceleration responsive member 12.

The member 12 engages the cam followers 68 and forces the levers 62 apart against the operation of the tensioned spring 64 so that the release catches 67 engage shoulder 71 of piston or slide member 72. Piston 72 serves the same function as the contact engaging member 14 but in this device or switch the piston or slide member 72 is guided by the inner walls of the housing 59.

A coil spring 73 is placed between the member 12 and the piston 72. Spring 73 serves the same function as spring 13 of the foregoing device. The spring 73 may be slightly compressed so that the piston 72 and the member 12 are relatively rigidly supported due to the compression forces separating the two members. The release catches 67 of levers 61 and 62 prevent the member 12 from being separated from the piston 72 when the acceleration responsive device is not operated. (See FIGURE 7.)

The entire mechanism is locked by a pin 78 which may be a manual safety device or remotely controlled (as by solenoids or hydraulically) on signal from other devices such as a programmer. The pin 78 rests against the housing 59 so that the shaft 77, which has as an extension a rack 79, will not permit the member 12 to move out of position even though acceleration forces of considerable magnitude are exerted on the device.

The shaft 77 fits through an aperture 81 in the housing 59 so that the shaft when the pin is removed may freely move with the acceleration responsive member 12. If, for example, pin 78 is solenoid operated when a signal is received in the line 82, the solenoid 74 is operated and extracts the pin 78 from the aperture 76 thus releasing the acceleration responsive device for operation. The member 12 moves downwardly as shown by the arrow in FIGURE 8 in response to acceleration forces generated by the moving vehicle or weapon. As the member 12 moves downwardly, the coil spring 73 is compressed between the member 12 and the piston 72. Piston 72 does not move initially because of the release catches 67 which engage shoulders 71 to immobilize the piston 72. When the member 12 moves a sufficient distance in the vertical direction, however, the cam follower 68 engage cam surfaces 83 and the spring 64 draws the levers 61 and 62 together over the cam surfaces 83. When levers 61 and 62 are drawn together by the spring 64, the release catches 67 disengage shoulders 71 and free the piston 72. The spring 73 which is now compressed to a considerable extent between member 12 and piston 72 forces the released piston 72 in a downward direction. Again note that all of the energy stored in the spring 73 as a result of the generated acceleration forces is utilized to force the piston 72 into engagement with contacts 84 and 85. Thus the contacts 84 and 85 are positively actuated by the piston or slide member 72.

The housing 59 guides the piston 72 within walls 86 and directs the piston in a straight line toward the contacts 84 and 85. An extension 87 is attached to the bottom 88 of the piston 72 and extends through an aperture 89 in the housing 59. This extension 87 provides additional control of the actuated piston 72 to insure that the piston 72 is guided in a controlled manner toward the contacts 84 and 85. The contacts 84 and 85 may be normally opened contacts as illustrated with respect to contact 85 or they may be normally closed contacts as illustrated by contact 84. Commonly both types of switches are required in these devices and either type of switch can be utilized in connection with this device. In fact a major advantage of this invention is that the main spring (13 or 73) normally will have ample force to operate numerous contacts. Also the acceleration device may be utilized to arm or actuate a simple mechanical mechanism. Extension 87 for example might simply be a pin utilized to strike a mechanical lever, a percussion detonator, or similar device.

The acceleration responsive member 12 is held in the downward position as shown in FIGURE 9 by the cam followers 68 which come to rest on the top surface 91 of the member 12. Thus the device is locked in position so that acceleration forces do not unlock the device and deactivate the switches. The device, however, may be reset for a future operation by simply moving the piston 72 vertically upward and forcing the levers 61 and 62 apart so that the member 12 returns under the influence of the compressed spring 73 to its original position separating the levers 61 and 62 as shown in FIGURE 7. The piston 72 is then locked so that the release catch 67 and shoulder 71 are again engaged.

This acceleration responsive device is also provided with an escapement mechanism 92. Escapement 92 serves the same function as set forth for the device described in FIGURES 4, 5 and 6. Although the escapement 92 is provided, such a time delay is not esssential to the operation of the acceleration responsive device. The same is true of the device disclosed in FIGURES 4, 5 and 6.

It is to be understood that the above described arrangements are simply illustrative of the application of the principles of the invention. Numerous other arrangements may be readily devised by those skilled in the art which will embody the principles of the invention and fall within the spirit and scope thereof.

Now therefore we claim:

1. An acceleration responsive device for actuating terminal contacts which comprises engaging means for operating said contacts, means for restraining movement of said engaging means, a spring connected to said engaging means, and flexing means which moves in response to acceleration forces to compress said spring and for releasing said engaging means from said means for restraining, said flexing means compresses said spring as a result of acceleration forces.

2. An acceleration responsive device in accordance with claim 1 which further includes means connected to said flexing means for delaying movement of said flexing means.

3. An acceleration responsive device for actuating terminal contacts which comprises engaging means for operating said contacts, means having a cam follower for restraining movement of said engaging means, a spring connected to said engaging means, and flexing means having camming surfaces and which moves in response to acceleration forces for compressing said spring and for engaging said cam follower to release said engaging means from said means for restraining, said flexing means compresses said spring as a result of acceleration forces.

4. An acceleration responsive device for actuating terminal contacts which comprises engaging means for operating said contacts, means for restraining movement of said engaging means, a compressible spring connected to said engaging means, and flexing means responsive to acceleration forces for compressing said spring against said engaging means and for releasing said engaging means from said means for restraining, said flexiing means compresses said spring as a result of acceleration forces.

5. A device in accordance with claim 4 which further includes insulating means attached to said engaging means at a point where said engaging means touches said contacts.

6. An acceleration responsive device for actuating terminal contacts which comprises engaging means for operating said contacts, pivotal means having an extension for holding said engagement means out of engagement with said contacts, at least one cam follower attached to said pivotal means, a compressible spring attached to said engaging means, and a flexing means responsive to acceleration forces for comprising said spring against said engaging means and for striking said cam follower to move said pivotal means out of engagement with said engaging means to release said engaging means.

7. An acceleration responsive device for actuating terminal contacts which comprises engaging means for operating said contacts, at least a pair of levers having an extension at one end, a cam follower on each of said levers, means for forcing said levers toward each other to engage and hold said engaging means with said extensions, a spring attached to said engaging means, and a flexing means responsive to acceleration forces for compressing said spring and for striking said cam followers to separate said levers and release said engaging means.

8. A device in accordance with claim 7 in which said means for forcing is a coil spring interconnecting said levers to draw said levers together.

9. A device in accordance with claim 7 which further includes guide means for controlling the direction of movement of said engaging means.

10. An acceleration responsive device for actuating terminal contacts which comprises engaging means for operating said contacts, a pivotal lever having a release catch at one end for holding said engaging means and a safety catch at the other end for locking said device, a cam follower attached to said lever between said safety catch and said release catch, a spring attached to said engaging means, an acceleration responsive means having a notch for flexing said spring against said engaging means from said catch, said safety catch enters said notch to lock said acceleration responsive means in place.

11. A device in accordance with claim 10 which further includes stop means on said engaging means for contacting said release catch to pivotally maintain said safety catch in said notch.

12. A device in accordance with claim 10 which further includes an escapment means attached to said acceleration responsive means for controlling the response of said acceleration responsive means to control actuation of said contacts.

13. An acceleration responsive device for actuating terminal contacts comprising engaging means for operating said contacts, guide means for controlling movement of said engaging means, at least a pair of levers pivotally connected to said guide means and having release catches at one end of each lever, cam followers connected to said levers, a first spring interconnecting said levers to force the levers together, a compressible second spring connected to said engaging means, and acceleration responsive means within said guide means for engaging said cam followers to move said levers apart and force said release catches which engage said shoulder to restrain movement of said engaging means and for compressing said second spring in response to acceleration forces, said acceleration responsive means having cam surfaces for releasing said levers to disengage said shoulder and catches to permit said second spring to force said engaging means into engagement with said contacts.

14. A device in accordance with claim 13 in which said guide means has a guide aperture and which further includes an extension connected to said engaging means for entering said aperture to guide said engaging means when said engaging means is released from said levers.

15. A device in accordance with claim 13 which further includes means connected to said acceleration responsive means and cooperating with said guide means for immoblizing said acceleration responsive means.

References Cited by the Examiner
UNITED STATES PATENTS

| | | | |
|---|---|---|---|
| 2,585,749 | 2/1952 | DiLorenzo et al. | 200—61.53 |
| 2,742,542 | 4/1956 | Bennett | 200—61.53 |
| 2,949,783 | 8/1960 | Butler | 200—61.45 |
| 3,092,697 | 6/1963 | Brothers | 200—61.53 |
| 3,106,403 | 10/1963 | Kirkman | 200—61.53 |

BERNARD A. GILHEANY, *Primary Examiner.*

ROBERT K. SCHAEFER, *Examiner.*

UNITED STATES PATENT OFFICE
CERTIFICATE OF CORRECTION

Patent No. 3,226,504 December 28, 1965

Albert F. Gallistel et al.

It is hereby certified that error appears in the above numbered patent requiring correction and that the said Letters Patent should read as corrected below.

Column 3, line 16, before "point" insert -- pivot --; column 4, line 21, for "At" read -- A --; column 8, line 22, for "comprising" read -- compressing --; line 59, for "escapment" read -- escapement --.

Signed and sealed this 6th day of December 1966.

(SEAL)
Attest:

ERNEST W. SWIDER
Attesting Officer

EDWARD J. BRENNER
Commissioner of Patents